July 10, 1956
S. C. CALVER
2,753,633
SLOPE GAUGE
Filed June 23, 1953
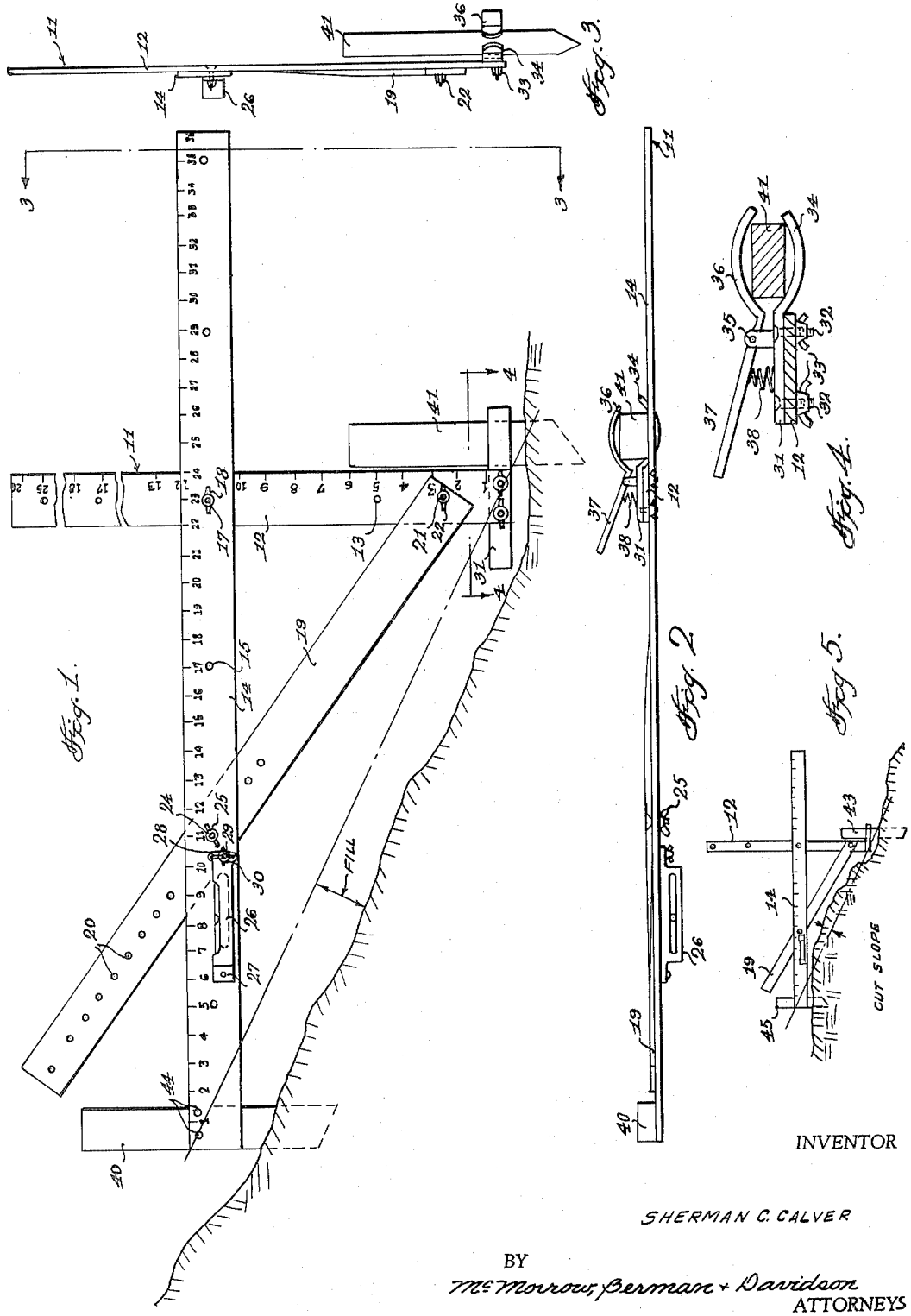
INVENTOR
SHERMAN C. CALVER
BY
McMorrow, Berman + Davidson
ATTORNEYS

2,753,633
SLOPE GAUGE
Sherman C. Calver, Farmington, Conn.

Application June 23, 1953, Serial No. 363,530

1 Claim. (Cl. 33—1)

This invention relates to grade finding implements, and more particularly to an improved slope gauge for establishing grades.

A main object of the invention is to provide a novel and improved slope gauge for establishing grades in earth work operations, as for setting stakes and establishing grades accurately on cut or fill operations, the device being simple in construction, being easy to use, and involving only a few parts.

A further object of the invention is to provide an improved slope gauge device for establishing grades either in cut or fill in earth work operations, said device being adapted to enable a combination of different slope angles to be set up in a rapid and simple manner, the device being inexpensive to manufacture, being rugged in construction, and being light in weight.

Further objects and advantages of the invention will become apparent from the following description and claim, and from the accompanying drawings, wherein:

Figure 1 is a side elevational view showing an improved slope gauge device according to the present invention arranged to locate the grade level on a slope to be filled.

Figure 2 is a top plan view of the implement illustrated in Figure 1.

Figure 3 is an end elevational view of the slope gauge implement shown in Figures 1 and 2.

Figure 4 is an enlarged horizontal cross sectional view taken on the line 4—4 of Figure 1.

Figure 5 is a side elevational view, considerably reduced in scale, showing the implement of Figure 1 employed to locate the grade level on a stake along a slope to be cut.

Referring to the drawings, the implement is designated generally at 11 and comprises a vertical arm 12 which is calibrated in inches along its length and which is further formed with apertures 13 spaced along its length. Designated at 14 is a calibrated horizontal bar member having a scale calibrated in inches and formed with apertures 15 spaced along its length. The horizontal arm 14 is pivotally connected to the vertical arm 12 by a bolt 17 extending through selected apertures 13 and 15, said bolt being provided with a wing nut 18 to clamp the arms 12 and 14 together at right angles to each other. Designated at 19 is an inclined strut bar which is formed adjacent its upper end with the evenly spaced apertures 20 and which is formed at its lower end with an aperture which is registered with one of the apertures 13 of the vertical bar 12 and through which extends the bolt 21 provided with a wing nut 22 for clamping the lower end of the strut bar 19 to the vertical bar 12. One of the apertures 20 in the upper portion of the strut bar 19 is registered with an aperture 15 of the horizontal bar 14 and receives a bolt 24 provided with a wing nut 25 for clamping the upper portion of the strut bar 19 to the horizontal bar 14, thus locking the horizontal bar 14 in right angular relationship with respect to the vertical bar 12.

Mounted on the forward end portion of the horizontal bar 14 is the bubble level 26 which is employed to set the horizontal bar 14 in an accurately horizontal position.

As shown in Figure 1, the bubble level 26 is pivotally connected to the horizontal bar 14 at 27 and is provided at its opposite end with an arcuate slot 28 through which extends a stud 29 on which is threadedly engaged a wing nut 30 for locking the bubble level 26 in a position exactly parallel with the longitudinal edges of the bar 14.

Designated at 31 is a clamping bracket which is detachably connected to the lower end of the vertical bar 12, as by the bolts 32 and wing nuts 33, the clamping bracket 31 being formed with the clamping jaw 34 and having pivotally connected thereto at 35 the opposing clamping jaw 36. As shown in Figure 4, the clamping jaw 36 is provided with the arm portion 37 which is biased away from the clamping bracket element 31 by a coiled spring 38, whereby the arcuate jaw portion 36 is biased toward the opposing jaw portion 34. Thus, when it is desired to establish the location of the grade line on a stake 40 relative to a lower stake 41 on a slope which is to be filled in, the clamping bracket 31 is secured to the lower end of the vertical bar 12 and the clamping elements 34 and 36 are engaged with the stake 41 at the previously established grade line on the said stake 41. The horizontal bar 14 is set relative to the vertical bar 12 in the manner illustrated in Figure 1 to provide the desired slope. For example, the horizontal bar 14 may be secured to the vertical bar 12 to define a two-to-one slope setting, as shown in Figure 1, and the horizontal bar may be locked in this setting by means of the strut bar 19. The forward end of the horizontal bar 14 is then disposed adjacent the upper stake 40 and the horizontal bar 14 is then adjusted to a level position, by means of the bubble level 26. The grade line may then be marked on the upper stake 40.

Referring now to Figure 5, the device may be employed to locate grade lines on lower stakes 43 in slope cutting operations. When thus employed, the clamping bracket 31 is secured to the end of the horizontal bar 14, said horizontal bar 14 being provided with the apertures 44 to receive the bolts 32 connecting the bracket member 31 to the horizontal bar, said bolts 32 being secured by the wing nuts 33 with the clamping jaws 34 and 36 projecting forwardly from the end of the horizontal bar 14. The clamping elements 34 and 36 are then engaged on the upper stake 45 and the stake 43 is driven into the ground adjacent the edge of the vertical arm 12, as illustrated in Figure 5. The horizontal bar 14 is then adjusted so as to be accurately horizontal, as by observing the position of the bubble in the bubble level 26 and adjusting the bar 14 until the bubble is centered. The grade line may then be marked on the stake 43 adjacent the zero end of the inch scale on the vertical bar 12.

To locate the grade line on the next stake, the procedure above described is repeated along the line between stations.

While a specific embodiment of an improved slope gauge device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A slope gauge for establishing grades comprising a calibrated vertical arm formed with apertures spaced along its length, a calibrated horizontal arm formed with apertures spaced along its length, bolt means extending through and pivotally connecting said horizontal arm to said vertical arm at selected apertures in said arms, an inclined strut bar formed along its length with spaced apertures, bolt means extending through selected apertures of said strut bar and apertures in said arms located at substantial distances from said pivotal connecting bolt means, a clamp detachably secured to the end of one of said arms for engaging a stake, and a bubble level mounted on said horizontal arm.

References Cited in the file of this patent

UNITED STATES PATENTS

| | | |
|---|---|---|
| 109,563 | Walton | Nov. 22, 1870 |
| 912,607 | Patterson | Feb. 16, 1909 |
| 948,777 | Tuomi | Feb. 8, 1910 |
| 977,735 | Hansen | Dec. 6, 1910 |
| 1,199,355 | Edmiston | Sept. 26, 1916 |
| 1,258,985 | Carney et al. | Mar. 12, 1918 |
| 1,496,889 | Kay | June 10, 1924 |
| 2,624,118 | Anderson | Jan. 6, 1953 |
| 2,627,115 | Pippin | Feb. 3, 1953 |
| 2,667,697 | McGrath | Feb. 2, 1954 |